United States Patent [19]

Essex

[11] 4,290,274
[45] Sep. 22, 1981

[54] LIQUID SPRAY DEVICE WITH ADAPTIVE DUTY CYCLE

[76] Inventor: Donald D. Essex, 1620 Georgia Ave., North Augusta, S.C. 29841

[21] Appl. No.: 57,975

[22] Filed: Jul. 16, 1979

[51] Int. Cl.$^3$ .......................................... G05D 23/32
[52] U.S. Cl. ...................................... 62/157; 62/171; 236/46 F
[58] Field of Search .................... 62/157, 171, 305; 236/46 F, 1 EB; 261/129; 234/75

[56] References Cited

U.S. PATENT DOCUMENTS

| | | | |
|---|---|---|---|
| 2,142,423 | 1/1939 | Timmis | 236/44 |
| 3,149,293 | 9/1964 | Farkas | 236/46 F |
| 3,443,121 | 5/1969 | Weisbrod | 236/46 F |
| 3,613,392 | 10/1971 | Di Tucci | 62/184 |
| 3,638,637 | 1/1972 | Coffman, Jr. | 236/44 |
| 3,872,684 | 3/1975 | Scott | 62/181 |
| 4,028,906 | 6/1977 | Gingold | 62/183 |
| 4,193,269 | 3/1980 | Barry | 62/171 |

OTHER PUBLICATIONS

Times–Union Journal, Jacksonville, 7/1/78, E-3. Mist-Mizer.

Primary Examiner—William E. Wayner
Attorney, Agent, or Firm—Saidman & Sterne

[57] ABSTRACT

An energy-saving device is disclosed which is particularly designed to control the temperature of the refrigerant in an air conditioning or refrigeration unit by evaporating a sprayed liquid on the refrigerant-containing vessels. The device may alternatively be utilized to introduce sprayed liquid into the heated air stream of a hot air furnace plenum to provide humidification. The device includes a temperature probe (24) which preferably comprises a thermistor that is positioned adjacent a control area where the temperature is desired to be monitored. A spray nozzle (38) causes a liquid to impinge upon the refrigerant-containing vessels, or to be evaporated in the hot air stream, to effect pre-cooling of the refrigerant prior to entering the condensing coil, or to effect evaporation of the water in the hot air stream to provide humidification. The output of the spray nozzle (38) comprises a series of bursts or spray cycles whose duty cycle within a predetermined period is determined by the temperature sensed by the thermistor (24). The thermistor (24) forms part of an electronic timing circuit (28) whose output is connected to control the actuation of the spray nozzle's water supply valve (32) so that the higher the temperature sensed by the probe, the longer the spray nozzle is turned on within the predetermined period.

7 Claims, 5 Drawing Figures

LIQUID SPRAY DEVICE WITH ADAPTIVE DUTY CYCLE

BACKGROUND OF THE INVENTION

1. Field of the Invention

The present invention is related to energy-saving controls for air conditioners and humidifiers and, more particularly, is directed towards a method and apparatus for adaptively controlling the duty cycle of a liquid spray device utilized with air conditioning units or as a humidifier, in accordance with the temperature sensed at a control point.

2. Description of the Prior Art

A conventional air conditioning system utilizes a compressor unit, usually placed outdoors, having a condensor coil which is cooled by passing a stream of outside air through the coil. Several devices are known which cool the condensor coil with water, which has the effect of reducing the overall outside air temperature and thereby increasing the efficiency of the compressor unit with a concomitant lower cost of operation. Such a device is exemplified, for example, by U.S. Pat. No. 4,028,906, which teaches a device for cooling a condensor coil by injecting an atomized mist of minute water particles into the upstream side of a stream of air passing through the coil. A spray nozzle 30 is controlled by a solenoid valve 10. The solenoid valve 10 is actuated when the compressor motor is energized, so that the mist is sprayed during the entire time that the compressor unit is on.

Other known prior art U.S. patents which relate to this general area include: U.S. Pat. Nos. 2,142,423; 3,613,392; and 3,872,684. U.S. Pat. No. 3,613,392 is also exemplary of an attachment for an air conditioner unit which sprays water in the space occupied by the condensor coil. The spray nozzles 26 are controlled by a solenoid circuit which, in turn, is controlled by a sensing means 40 that includes a thermostat 44 which senses the ambient temperature to close the solenoid circuit when outside air temperature exceeds a predetermined figure. The sensing means 40 also includes a thermal bulb 46 connected adjacent a line 14 for responding to the temperature of the liquid refrigerant within the line for closing the solenoid valve when the temperature becomes undesirably high.

Each of the systems exemplified by the above-cited patents suffers from one or more deficiencies. One common deficiency of the prior art water vapor cooling systems for condensor coils is that the amount of water which is sprayed onto the condensing coil is relatively unregulated. While the amount of water sprayed per unit time onto the coils may be controlled by the size, number and location of the spray nozzles, the total length of time that the spray nozzles are on appears to be regulated in one instance only by the total amount of time that the compressor is energized and, in another instance, in accordance with the energization of the compressor in combination with detection of a predetermined minimum threshold temperature. The relative insensitivity to temperature of the prior art devices can lead to situations where considerable amounts of water are wasted, which can reduce the overall efficiency of the unit. For example, at the minimum temperature of activation of the compressor unit, if the spray nozzle or nozzles are actuated for the entire cycle of the compressor's activation, far too much water is sprayed on the coils than can be effectively evaporated during operation. Conversely, when it is extremely hot, and the compressor is running for a relatively long cycle, the predetermined nozzle sizes may provide insufficient water on the coils for maximizing temperature reduction over the operating cycle.

I have recognized that it would be extremely advantageous to provide a water spray device for cooling the condensor coil of an air conditioning or refrigeration unit which takes into account the instantaneous temperature of a control point such as the temperature of the refrigerant just prior to entering the condensor coils. Such a system would be an improvement over the prior art systems described above in that the amount of water sprayed on the condensor coil would be exactly controlled over the entire anticipated operating temperature range of the unit. A fixed cycle of operation can be established for the spray nozzle or nozzles, and within the predetermined cycle, the spray nozzle will be turned on a greater proportion of the time as the sensed temperature increases. Conversely, the duty cycle of the spray nozzle will decrease as the sensed temperature decreases. In this manner, maximum efficiency and energy reduction can be achieved.

I have also come to realize that similar deficiencies exist in spray nozzle humidifiers for hot air furnaces. That is, prior art humidifiers inject a spray into the hot air stream when the sensed humidity falls below a predetermined value and the sensed temperature rises above a predetermined value. However, it frequently occurs in such systems that the water spray cannot be fully evaporated so that liquid condensation results which can cause rust and deterioration of the metal duct work. With the present invention utilized as a humidifier, the bursts of water sprays increase in length proportionately as the air temperature increases, thereby matching water spray and air temperature solubility to eliminate excess wetness and deterioration of the sheet metal duct work.

OBJECTS OF THE INVENTION

It is therefore an object of the present invention to provide a method and apparatus for generating a liquid spray having a temperature adaptive duty cycle which overcomes the deficiencies noted above with respect to the prior art devices.

Another object of the present invention is to provide a novel and unique apparatus for cooling the refrigerant-containing vessels of an air-cooled refrigeration or air conditioning unit which maximizes efficiency by wetting the vessels with an amount of water just sufficient to be evaporated.

An additional object of the present invention is to provide an energy-saving device for reducing the temperature of the refrigerant in an air conditioning or refrigeration unit by precisely metering a water spray onto the refrigerant-containing vessels in accordance with the instantaneous temperature of the refrigerant.

A further object of the present invention is to provide a unit for precision control of the duty cycle of a spray nozzle for an air conditioner or humidifier which is compact in size, solid state in construction, may be adapted to be utilized with any size air conditioning or humidification system, is capable of controlling multiple installations running at the same time, may be remotely located in a theft-proof or weather-proof location, or on the unit, and which may be readily mass-produced utilizing known electronic components.

A still further object of the present invention is to provide a humidifier for generating a liquid spray in the heating portion of the duct work of a forced air heating system which overcomes the problem of overwetting the duct work, thereby eliminating rust and corrosion.

SUMMARY OF THE INVENTION

The foregoing and other objects are attained in accordance with one aspect of the present invention through the provision of apparatus for cooling the refrigerant-containing vessels of an air-cooled refrigeration or air conditioning unit, which comprises valve means including an inlet port for receiving a cooling fluid from a source, and an outlet port for delivering the cooling fluid when the valve means is open, nozzle means for receiving the cooling fluid from the outlet port of the valve means and for directing the cooling fluid onto the refrigerant-containing vessels, and control means for opening and closing the valve means for variable time periods that are proportional to the temperature sensed at a control point in the unit. The control means more particularly includes timing means having a predetermined period that consists of an on cycle and an off cycle, the time periods of the on and off cycles within the predetermined period being variable in proportion to the temperature.

In accordance with more specific aspects of the present invention, the timing means includes first timer means for producing an output signal during the on cycle, the control means including means responsive to the output signal for closing the valve means as long as the output signal is received. The first timer means further includes means for sensing the temperature of the unit at the control point and, in a preferred embodiment, the temperature sensing means comprises thermistor means whose resistance decreases as the temperature increases. The first timing means includes means responsive to a decrease in the resistance of the thermistor means for decreasing the time period of the output signal whereby the valve means is opened for a longer period of time during the predetermined period in response to an increase in the sensed temperature.

In accordance with more specific aspects of the present invention, the means responsive to the output signal preferably comprises a normally closed relay in series circuit with the valve means. Further, the timing means preferably includes second timer means for generating an output pulse at a frequency corresponding to the predetermined period, the first timer means being responsive to the output pulse for triggering the production of the output signal. The first and second timer means may respectively comprise a monostable and an astable multivibrator.

In accordance with another aspect of the present invention, there is provided a humidifier for generating a liquid spray in the heating portion of the duct work of a forced air heating system, which comprises nozzle means connected to receive water for directing a liquid spray within the heating portion of the duct work, valve means including an inlet port for receiving water from a source and an outlet port for delivering the water to the nozzle means when the valve means is open, means for sensing the temperature of the air passing through the heating portion of the duct work, and control means for opening and closing the valve means for variable time periods that are proportional to the temperature.

In accordance with yet another aspect of the present invention, there is provided a method of generating a liquid spray having a temperature adaptive duty cycle, which comprises the steps of generating a first timing pulse having a first time period within which the liquid spray is to be turned on once and off once, sensing the temperature at a control point, generating a second timing pulse at a frequency responsive to the first timing pulse, the second timing pulse having a pulse width inversely proportional to the temperature sensed at the control point, and actuating valve means for controlling the generation of the liquid spray for a second time period dependent upon the pulse width of the second timing pulse. The step of actuating valve means preferably includes the step of closing the valve means for the second time period and opening the valve means for a period of time equal to the difference between the first and second time periods. The step of sensing the temperature preferably includes the step of placing a temperature-responsive resistance element at the control point, the element having a decreasing resistance in response to increasing temperature. The step of generating a second timing pulse preferably includes the step of decreasing the pulse width in response to a decrease in resistance of the element.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

The present invention broadly monitors the temperature of an air conditioning condensor or a forced air furnace plenum and directs an aqueous mist onto the condensor for cooling purposes or into the hot air plenum for humidification. By carefully metering the mist delivered to the condensor coils, a constant "flash point" amount of wetting can be approximated without inefficiently wetting the hot coils. When installed in a hot air plenum, only enough spray is introduced as is sufficient to be totally evaporated without wetting and consequently rusting the sheet metal of which the plenum is constructed.

Figure 2:
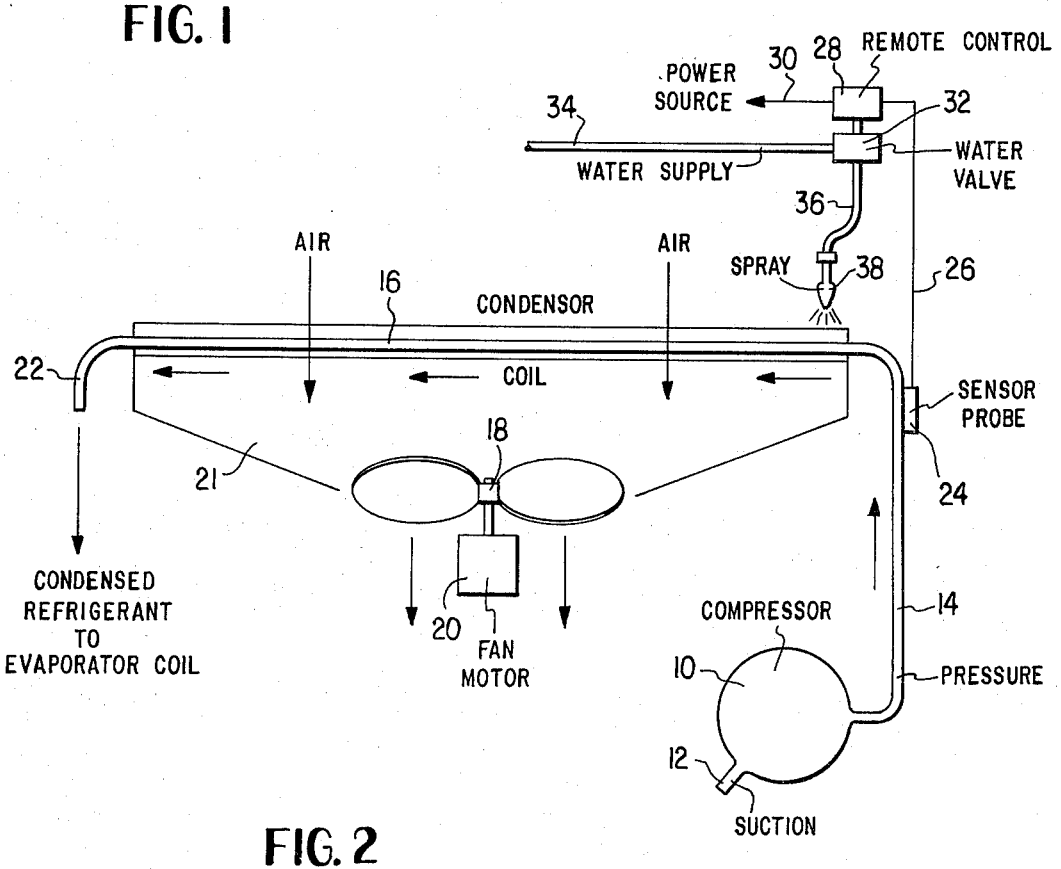
FIG. 2 is an illustration of an air conditioning system in combination with the control unit of the present invention.

Referring first to FIG. 2, the present invention is illustrated in combination with a standard air-cooled refrigeration or air conditioning unit. The present invention controls the pressure and temperature of the refrigerant through the evaporation of sprayed liquid on the refrigerant-containing vessels. Indicated in FIG. 2 by reference numeral 10 is a compressor motor which receives refrigerant via a suction inlet 12 from the evaporator coil. Compressor 10 delivers the relatively hot refrigerant under pressure through outlet vessel 14 that leads to a standard condensor coil 16 of the unit.

Condensor coil 16 circulates the liquid refrigerant and is in a cooling air path created by a fan 18 driven by a motor 20. Reference numeral 21 schematically indicates the casing of the condensor which directs the air drawn by fan 18 over condensor coil 16 to thereby cool the liquid refrigerant in condensor coil 16. An outlet pipe 22 delivers the cooled refrigerant from the condensor coil 16 to the evaporator coil (not shown) to reinitiate the cooling cycle.

The present invention includes the provision of a thermal probe or sensor 24 which is connected to the surface desired to be controlled, or adjacent to it, as may be determined by the requirements of the particular unit desired to be controlled. Sensor probe 24 preferably comprises a thermistor, which is a temperature-sensitive resistance element whose resistance varies in inverse proportion to the temperature sensed in the vicinity of the element. More particularly, the resistance of thermistor 24 decreases as the sensed temperature increases.

In FIG. 2, the thermal probe or thermistor 24 is shown positioned adjacent the refrigerant-containing vessel 14 at the inlet to the condensor coil 16 for monitoring the temperature of the refrigerant just prior to its entering the condensor coil 16.

The sensor probe 24 is connected in circuit with an electronic remote-control unit 28 via leads 26. Remote-control unit 28 may be positioned in any desirable location, and is provided with electrical power via power line 30. The operation of the remote-control unit 28 of the present invention will be described in greater detail below.

As seen in FIG. 2, unit 28 controls the actuation of a water valve 32 which is supplied with a source of water via inlet water supply line 34. When valve 32 is opened by unit 28, the water from supply line 34 is fed to an outlet line 36 for delivery to a spray nozzle 38. Spray nozzle 38 is located so as to deliver a water spray on the refrigerant-containing vessel just prior to the entry of the refrigerant into the condensor coil 16. The evaporation of the liquid spray on the refrigerant-containing vessel 14 will remove heat from the liquid refrigerant in vessel 14, thereby effecting pre-cooling of the refrigerant just as it enters the condensor coil 16.

The remote-control unit 28 acts in response to the temperature sensed by probe 24 to control the duty cycle of the liquid spray from nozzle 38. That is, as will be explained more fully below, unit 28 establishes a predetermined time interval within which the liquid spray from nozzle 38 will be turned on once and off once. The time during which the spray will be on or off within the predetermined time interval will be proportional to the temperature sensed by probe 24. The warmer the temperature sensed by probe 24, the longer will be the on cycles of the water spray from nozzle 38. The on cycles of the nozzle 38 remain directly proportional to the temperature of the probe 24 to produce lower head pressures and lower electrical consumption as well as colder condensor coils and, hence, cooler discharge air through the condensor coil 16. Although the precise positioning of the sensor probe 24 and spray nozzle 38 is not critical to the operation of the present invention, the locations thereof may be varied as may be necessary to suit the particular needs of the unit or the operating conditions. The configuration illustrated in FIG. 2 is presented as the best mode presently contemplated for carrying out the present invention.

Figure 1:
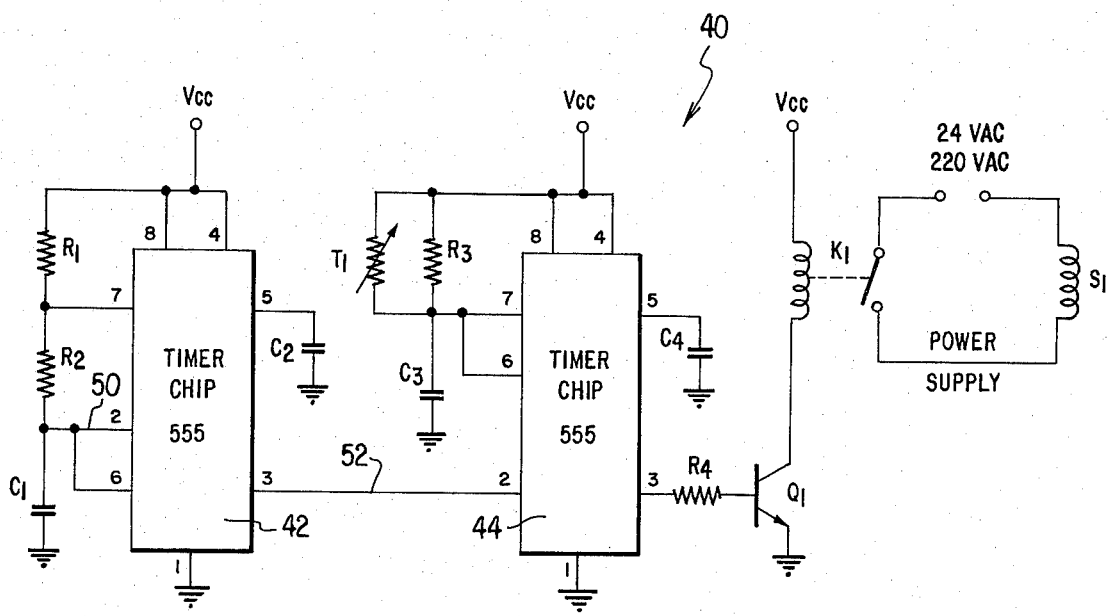
FIG. 1 is a schematic circuit diagram which illustrates a preferred embodiment of an electronic control unit in accordance with the present invention.

Referring now to FIG. 1, reference numeral 40 indicates generally a preferred embodiment of a control circuit of the present invention which broadly includes components from elements 24, 26, 28, 30 and 32 of FIG. 2. Control circuit 40 operates as a timing circuit to control the on times of the water spray from nozzle 38 in response to the temperature sensed by probe 24. The electrical element counterpart of sensor probe 24 is indicated in FIG. 1 by thermistor T1.

Control circuit 40 basically consists of a pair of timing circuits indicated respectively by reference numerals 42 and 44. Broadly, timing circuit 42 establishes a predetermined period of time within which the water spray from nozzle 38 will be turned on once and turned off once. The output 52 from timing circuit 42 triggers the second timing circuit 44 which delivers an output signal to a driver transistor Q1 each time it is triggered by timing circuit 42. The pulse width of the output signal from timing circuit 44 is made variable in proportion to the resistance of thermistor T1, which is connected as sensor probe 24 (FIG. 2). That is, as the temperature sensed by probe 24 rises, the resistance of thermistor T1 goes down. This has the effect, as will be explained more fully below, of decreasing the pulse width of the output signal from timing circuit 44 to thereby decrease the on time of transistor Q1 per cycle of timing circuit 42.

Transistor Q1, when enabled by the output pulse from timing circuit 44, acts to open a normally-closed relay K1 which is connected in series circuit with a solenoid S1 of the water valve 32 (FIG. 2). Thus, as the sensed temperature increases, relay K1 is opened less per cycle of operation, so that the water spray from nozzle 38, controlled by solenoid S1 of water valve 32, is on for a greater proportion of time per cycle than would be the case at a lower temperature.

Still with reference to FIG. 1, timing circuits 42 and 44 preferably each consists of a well-known TTL integrated circuit timer chip known as type 555. Timer 42 is configured in an astable or free-running oscillator configuration in which capacitor C1 charges through resistors R1 and R2 from a low-level, e.g., five volt, voltage source VCC until the voltage across capacitor C1 just exceeds ⅔ VCC. Capacitor C1 then discharges through resistor R2 until its voltage is just less than VCC/3. The charge time for astable multivibrator operation of timer 42 may be defined by the following equation: $T1 = 0.7(R1 + R2)C1$. The discharge time for circuit 42 is: $T2 = 0.7 R2 C1$, so that the total period of oscillation is: $T_{42} = T1 + T2 = 0.7(R1 + 2R2)C1$.

Timing chip 44 is connected as a monostable multivibrator. Timing capacitor C3 is charged from VCC through the parallel resistance combination of thermistor T1 and resistor R3. An input triggering pulse to pin 2 of timer 44 from output line 52 of timer 42 begins the timing cycle of timer 44. The voltage across capacitor C3 is applied to the threshold input of timer 44 (pin 6). When the voltage across capacitor C3 reaches to VCC/3, the cycle is terminated by the discharging of capacitor C3. The time $T_{44}$ of a cycle is the time required for the capacitor C3 to charge from nominally zero to ⅔ VCC, and can be represented by the following equation: $T_{44} = (1.1)RC3$, where R is the parallel resistance of thermistor T1 and resistor R3. In other words, the on cycle time of the output pulse from pin 3 of monostable 44 is dependent upon the resistance of thermistor T1. As the temperature sensed by thermistor T1 increases, the resistance thereof decreases. As the resistance of thermistor T1 decreases, the combined resistance of thermistor T1 and resistor R3 decreases. Thus, as may be seen from the equation above, as R decreases, the on cycle time $T_{44}$ decreases, which reduces the output pulse width from pin 3 of timer 44.

The on time of transistor Q1 is therefore shorter with increasing temperature, which will cause the normally-closed contacts of relay K1 to open less per cycle (the cycle time being determined by timer 42), so that the water spray from nozzle 38, controlled by solenoid S1 of water valve 32, will be on more time per cycle as the temperature rises.

The values of the circuit components of FIG. 1 may be selected to suit any desired application. For example, it may be desired to have a total operating cycle of 20 seconds (controlled by timer 42) wherein the period of the output signal from timer 42 can vary from 1 second to 15 seconds of the total cycle time, in accordance with the sensed temperature. Although not intended to be limiting in any manner, the following parts list is exemplary of part numbers and values for the components of the circuit of FIG. 1 which produce a 20-second total cycle time within which the duty cycle of the spray nozzle may be varied between 10% and 90%.

| Element | Part No./Value |
|---------|----------------|
| VCC     | +5 VDC         |
| R1      | 220K           |
| R2      | 2M             |
| C1, C3  | 6.8 μf.        |
| C2, C4  | 0.1 μf.        |
| R3      | 1M             |
| R4      | 1K             |
| Q1      | 2N2222A        |
| T1      | Fenwal GA62P22 |

Figure 4:
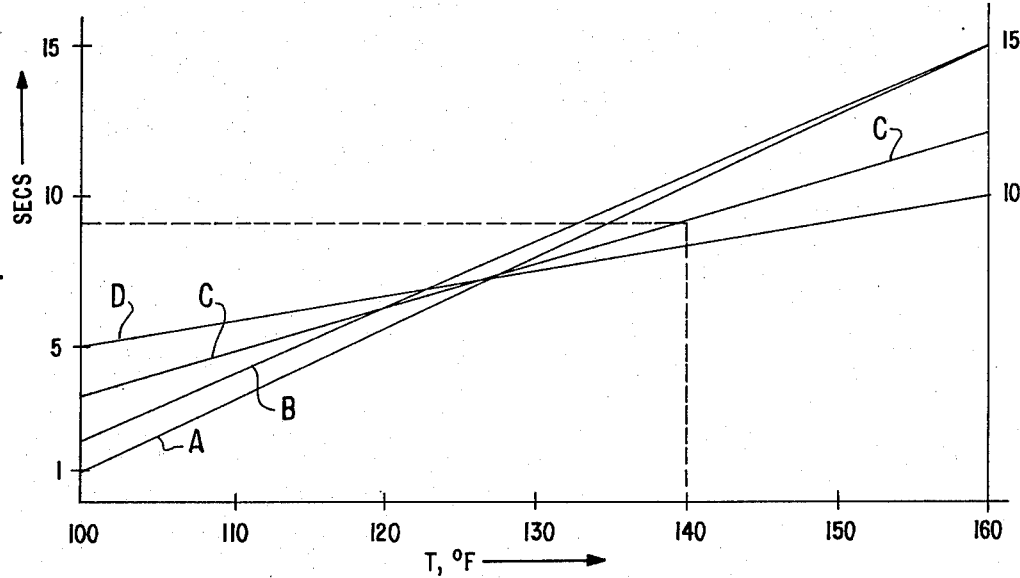
FIG. 4 is a graph illustrating a set of operating curves for the control unit of the present invention.

In FIG. 4 are illustrated a number of possible operating curves A, B, C and D for the circuit of FIG. 1. In FIG. 4, the X axis represents the temperature sensed by thermistor T1, while the Y axis represents the on time per cycle for the spray nozzle 38. This graph assumes a total cycle time established by timer 42 of 20 seconds. As may be appreciated from FIG. 4, the low end range of curves A, B, C and D can select an on time for the water spray of from 1 to 5 seconds at 100°. At the high end of the operating range (160°), the on time of the water nozzle per cycle may range from 10 to 15 seconds. Taking curve C as an example, the low end (100°) on time is set at 3.6 seconds, while the high end (160°) on time is set at approximately 12.2 seconds. At an intermediate temperature of 140°, the relay K1 will be closed (unactuated) for 9 seconds to deliver a 9-second spray per cycle, and will be open (actuated) for 11 seconds, so that the spray will be off for 11 seconds out of the 20-second cycle. Thus, at that particular temperature, the pulse width or period of the output signal from timer 44 will be approximately 11 seconds.

Figure 3:
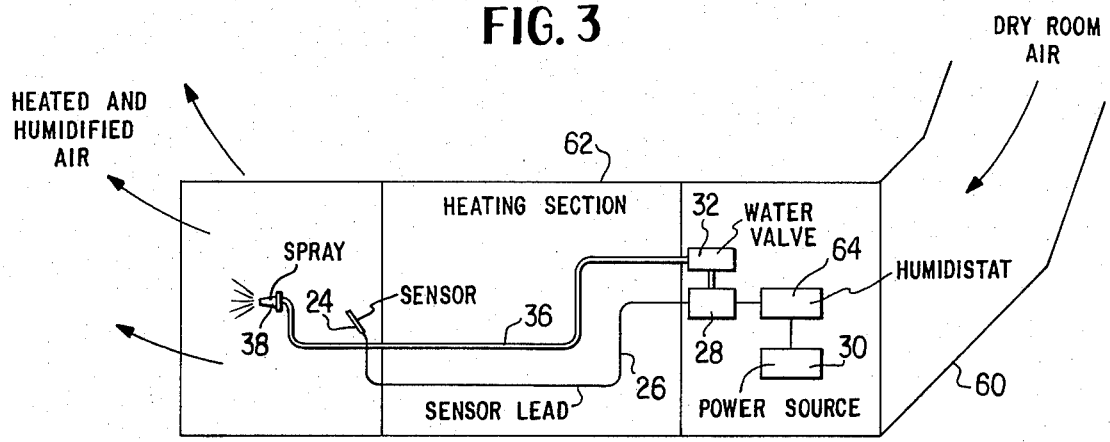
FIG. 3 is an illustration of the present invention utilized as a humidifier.

Referring now to FIG. 3, the present invention is shown functioning as a humidifier within the hot air plenum of a forced air furnace. Reference numeral 60 indicates an inlet duct which conducts dry room air to a heating section 62 of the furnace. Within duct work 62 is positioned the spray nozzle 38 supplied with water from pipe 36 via water valve 32. Valve 32 is controlled by the electronic control unit 28 of the present invention via a power source 30 and humidistat 64. The sensor probe or thermistor 24 is connected to control unit 28 by lead 26. Similar to the operation set forth above, as the temperature of the air in heating section 62 rises, the resistance of the thermistor in probe 24 decreases, and the spray time per cycle increases.

Figure 5:
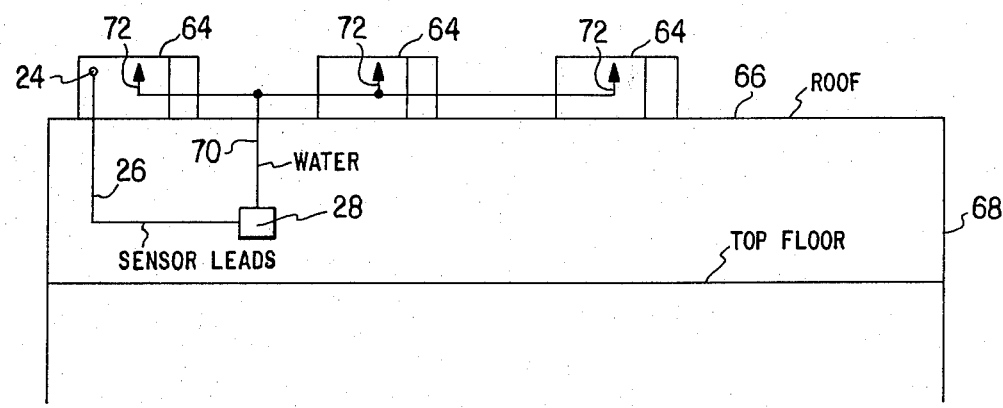
FIG. 5 is a schematic representation of how the control unit of the present invention may be utilized with multiple loads.

FIG. 5 illustrates the use of a single control unit 28 of the present invention for controlling multiple air conditioning units 64 which may be mounted on the roof 66 of a building 68. A central water source 70 may be controlled by unit 28 to deliver water to nozzles 72 within units 64. One or more sensors 24 may be connected to unit 28 with leads 26.

The thermal probe 24 preferably comprises a closefitting copper tube jacket containing a thermistor (of the type indicated above) with insulated leads soldered to extended leads. The tubing is sealed with silver bearing solder (92% tin, 8% silver) on one end and, on the lead end is sealed with silicon rubber. This results in a compact, strong, highly conductive control point probe which may be located on any point needing control. When used as a control for the humidifier embodiment, the probe may be clipped to a support and inserted into the heated air stream of the heating system where it senses the air temperature and modulates the water vaporizing action of spray 38 to match the solubility of the air stream as it varies with the temperature of the air, thereby eliminating any wetness and resulting corrosion on the sheet metal duct work.

Accordingly, it may be appreciated that the present invention consists of an all-season control device that effectively reduces unit operating costs and maintenance while increasing the life of the compressor in cooling applications and reducing fuel consumption while giving a more healthful environment when used as a humidifier.

Obviously, numerous modifications and variations of the present invention are possible in light of the above teachings. It is therefore to be understood that within the scope of the appended claims, the invention may be practiced otherwise than as specifically described herein.

I claim as my invention:

1. Apparatus for cooling the refrigerant-containing vessels of a refrigeration or air conditioning unit, which comprises:

valve means including an inlet port for receiving a cooling fluid from a source and an outlet port for delivering said cooling fluid when said valve means is open;

nozzle means for receiving said cooling fluid from said outlet port of said valve means and for directing said cooling fluid onto said refrigerant-containing vessels;

control means for opening and closing said valve means for variable time periods that are proportional to the temperature sensed at a control point in said unit, said control means including timing means having a predetermined period that consists of an on cycle and an off cycle, the time periods of said on and off cycles within said predetermined period being variable in proportion to said temperature, wherein said timing means includes first timer means for producing an output signal during said on cycle, said control means responsive to said output signal for opening said valve means; and means for sensing said temperature of said unit at said control point comprising a thermistor means whose resistance decreases as said temperature increases, wherein said first timing means includes means responsive to a decrease in resistance of said thermistor means for decreasing the time period of said output signal, whereby said valve means is opened for a longer period of time during said predetermined period in response to an increase in said temperature.

2. The apparatus as set forth in claim 1, wherein said means responsive to said output signal comprises a normally closed relay in series circuit with said valve means.

3. The apparatus as set forth in claim 1, wherein said timing means further includes second timer means for generating an output pulse at a frequency corresponding to said predetermined period, said first timer means being responsive to said output pulse for triggering the production of said output signal.

4. The apparatus as set forth in claim 3, wherein said first and second timer means respectively comprise a monostable and an astable multivibrator.

5. A method of generating a liquid spray having a temperature adaptive duty cycle, comprising the steps of:

generating a first timing pulse having a first time period within which said liquid spray is to be turned on once and off once;

sensing the temperature at a control point;

generating a second timing pulse at a frequency responsive to the frequency of said first timing pulse, said second timing pulse having a pulse width inversely proportional to said temperature sensed at said control point; and actuating valve means for controlling the generation of said liquid spray dependent upon a second time period equal to said pulse width of said second timing pulse including the step of closing said valve means for said second time period and opening said valve means for a period of time equal to the difference between said first and second time periods.

6. A method as set forth in claim 5, wherein said step of sensing the temperature includes the step of placing a temperature-responsive resistance element at said control point, said element having a decreasing resistance in response to increasing temperature.

7. A method as set forth in claim 6, wherein said step of generating a second timing pulse includes the step of decreasing said pulse width in response to a decrease in resistance of said element.

* * * * *